United States Patent

Saitoh et al.

[11] Patent Number: 5,937,430
[45] Date of Patent: Aug. 10, 1999

[54] BUFFER CIRCUIT WITH CONTROL DEVICE TO DIRECTLY OUTPUT INPUT DATA OR TO OUTPUT INPUT DATA WRITTEN IN STORAGE DEVICE

[75] Inventors: Minoru Saitoh; Hideo Arai, both of Kawasaki, Japan

[73] Assignee: Fujitsu Limited, Kawasaki, Japan

[21] Appl. No.: 08/684,626

[22] Filed: Jul. 22, 1996

Related U.S. Application Data

[63] Continuation of application No. 08/335,398, Nov. 3, 1994, abandoned.

[30] Foreign Application Priority Data

Nov. 19, 1993 [JP] Japan .................................. 5-290160

[51] Int. Cl.$^6$ .................................................. G06F 13/00
[52] U.S. Cl. ............................................ 711/138; 712/218
[58] Field of Search .................................... 395/465, 445; 711/138, 118; 712/218

[56] References Cited

U.S. PATENT DOCUMENTS

| 4,866,609 | 9/1989 | Calta et al. ................................ 710/54 |
|---|---|---|
| 4,942,518 | 7/1990 | Weatherford et al. ................... 711/138 |
| 5,113,515 | 5/1992 | Fite et al. ................................. 711/125 |
| 5,247,639 | 9/1993 | Yamahata ................................. 711/138 |
| 5,255,239 | 10/1993 | Taborn et al. ............................ 365/221 |
| 5,257,359 | 10/1993 | Blasco et al. ............................. 711/138 |
| 5,459,852 | 10/1995 | Nakagawa et al. ...................... 711/138 |
| 5,608,892 | 3/1997 | Wakerly et al. ......................... 711/118 |

*Primary Examiner*—Zarni Maung
*Assistant Examiner*—Kenneth R. Coulter
*Attorney, Agent, or Firm*—Staas & Halsey

[57] ABSTRACT

A buffer circuit comprises a storage unit for storing input data, a control unit for controlling an output of input data to an external circuit either directly or via the storage unit by writing the input data into the storage unit and then reading the input data out therefrom, and a selection unit for selecting for an output either the input data for direct output or the input data written into and then read out from the memory unit. The control unit determines whether input data exist and whether the external circuit is ready for receiving output data, and controls, based on a result of the determination, the output of the selection unit to the external circuit.

14 Claims, 5 Drawing Sheets

BUFFER CIRCUIT WITH CONTROL DEVICE TO DIRECTLY OUTPUT INPUT DATA OR TO OUTPUT INPUT DATA WRITTEN IN STORAGE DEVICE

This application is a countinuation of application Ser. No. 08/355,398, filed Nov. 3, 1994, now abandoned.

BACKGROUND OF THE INVENTION

1. Field of the Invention

This invention pertains to a buffer circuit for use in buffering data in a digital apparatus, such as a computer and a communications device.

2. Description of the Related Arts

Generally, because a digital apparatus, e.g. a computer and a communications device, adopts a method by which a required result is obtained by sequentially processing a series of data, its buffer circuit for buffering data must preserve an input/output sequence of the series of data in a predetermined format. Thus, an actual buffer circuit of a digital apparatus uses a FIFO (first-in, first-out) buffer or a LIFO (last-in, first-out) buffer.

However, this principle applies only to a generic digital apparatus, since there are cases in which a logical simulation apparatus for simulating the operation of a logical circuit need not preserve an input/output sequence of a series of data, in buffering a series of data, which are grouped together. The following is a description of a case in which a digital apparatus need not preserve an input/output sequence of a series of data, with reference to an outline of the operation and configuration of a conventional logical simulation apparatus.

Figure 1:
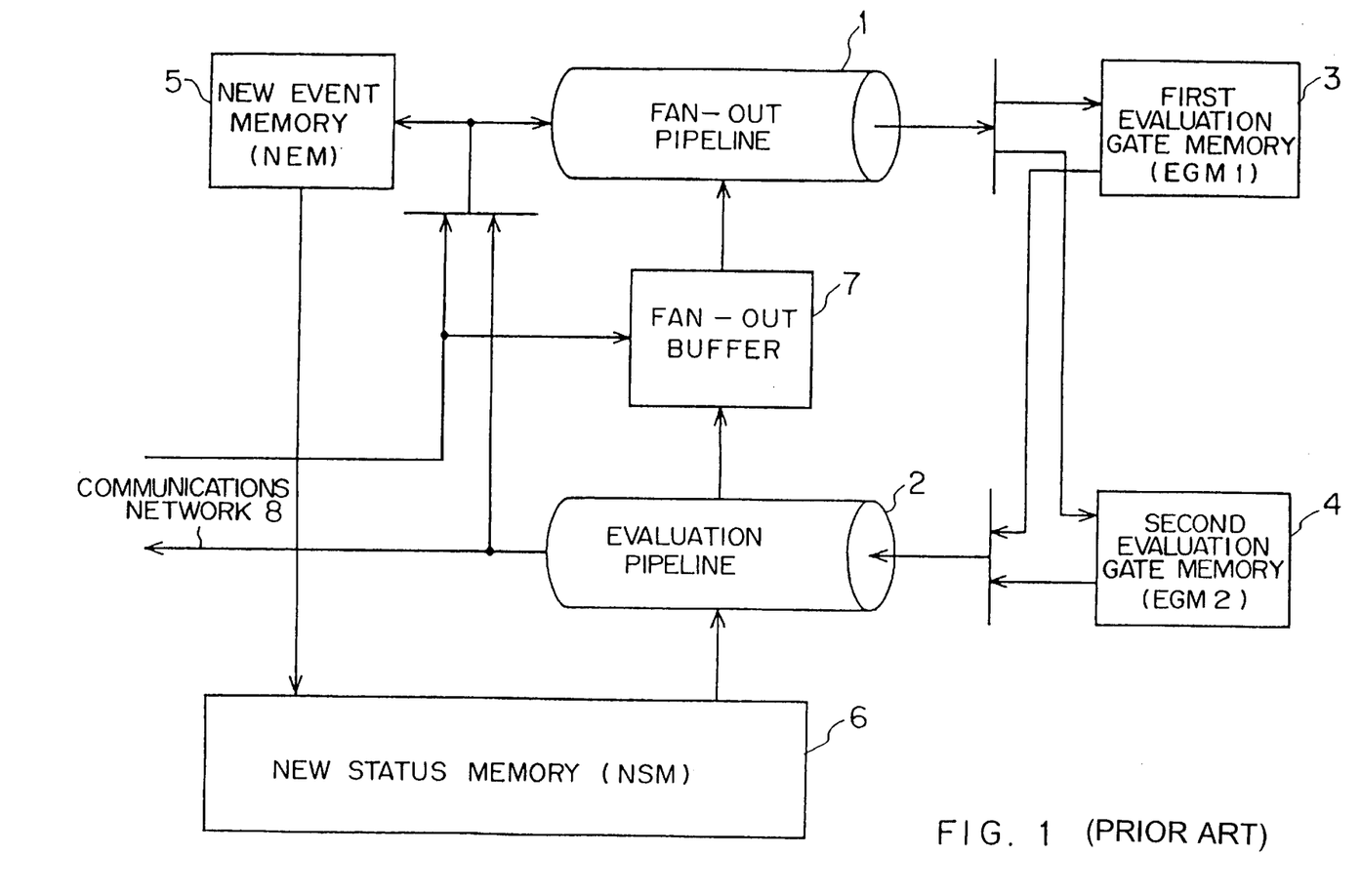
FIG. 1 (PRIOR ART) is a block diagram outlining the circuit configuration of a conventional generic logical simulation apparatus.

FIG. 1 is a block diagram outlining the circuit configuration of a conventional generic logical simulation apparatus.

Japanese patent application publication circulars 1988-204441 and 1992-3229 concretely disclose the conventional generic logical simulation apparatus shown in FIG. 1.

The conventional generic logical simulation apparatus comprises a fan-out pipeline 1, an evaluation pipeline 2, a first evaluation gate memory (EGM1) 3, a second evaluation gate memory (EGM2) 4, a new event memory (NEM) 5, a net status memory (NSM) 6 and a fan-out buffer 7.

The conventional generic logical simulation apparatus comprises a communications network 8 for mutual communications, upon each evaluation of a gate group of a unit by a simulation apparatus operating in parallel with other plural logical simulation apparatuses having the same configuration, where a unit is defined as a minimum circuit unit configuring a combination circuit but not configuring a sequence circuit.

The fan-out pipeline 1 searches the gates at fan-out destinations of a particular gate whose output value changes in correspondence with the change of its input value, of the gates included in a gate group of a unit of a logical circuit. It supplies to the first evaluation gate memory (EGM1) 3 or the second evaluation gate memory (EGM2) 4 gate numbers assigned to the searched gates at the fan-out destinations as gate data.

The evaluation pipeline 2 evaluates whether or not the output values of the gates at the fan-out destinations change in correspondence with their input values, based on the gate data stored in the first evaluation gate memory (EGM1) 3 or the second evaluation gate memory (EGM2) 4. It supplies as new event data a gate number to the gate whose output value has changed of the evaluated gates at the fan-out destinations simultaneously to the new event memory (NEM) 5 and the fan-out buffer 7. It determines the output value of a gate whose input value has changed, on receiving from the net status memory (NSM) 6 status data on a desired gate.

The new event memory (NEM) 5 stores as new event data event data on a gate that changes its output value at a timing t, based on the evaluation result by the evaluation pipeline 2 at a timing t−1.

The net status memory (NSM) 6 stores status data on a gate which a processor evaluates.

The first evaluation gate memory (EGM1) 3 and the second evaluation gate memory (EGM2) 4 alternately input and output gate data at each timing in the above operation. For example, when the first evaluation gate memory (EGM1) 3 has received gate data from the fan-out pipeline 1 at timing t, the second evaluation gate memory (EGM2) 4 outputs to the evaluation pipeline 2 gate data received at timing t−1; and when the second evaluation gate memory (EGM2) 4 has received gate data from the fan-out pipeline 1 at a timing t+1, the first evaluation gate memory (EGM1) 3 outputs to the evaluation pipeline 2 gate data received at timing t.

While the first evaluation gate memory (EGM1) 3 and the second evaluation gate memory (EGM2) 4 repeat the alternate processes of an input and an output of gate data, the evaluation pipeline 2 generates new event data. As a result, when the new event memory (NEM) 5 stores a complete set of new event data on a gate group of a single particular unit belonging to a system composed of plural units, the net status memory (NSM) 6 changes to net status data of a gate group of a single unit to be evaluated next, its content supplied to the evaluation pipeline 2, in accordance with the complete set of new event data.

On the other hand, when the fan-out pipeline 1 has not completed searching the gates at the fan-out destinations of a gate included in the gate group of a single unit currently processed, the fan-out buffer 7 temporarily stores new event data supplied from the evaluation pipeline 2 to the fan-out buffer 7, and outputs them to the fan-out pipeline 1 only after the fan-out pipeline 1 completes searching the gates at the fan-out destinations. The fan-out pipeline 1 searches a gate of the fan-out destination of a gate group of the same single unit, based on the gate numbers included in the new event data.

That is, because the fan-out pipeline 1 searches a plurality of gates at fan-out destinations, it may take a longer time for the fan-out pipeline 1 to search for the plurality of gates at the fan-out destinations than a time for the evaluation pipeline 2 to evaluate the output values of the gates at the fan-out destinations. Thus, the fan-out buffer 7 buffers new event data to absorb this time difference.

The conventional generic logical simulation apparatus may have the fan-out pipeline 1 search in any sequence the gates at the fan-out destinations of the gate group of a single unit. A search of the gates at the fan-out destinations of the gate group of a single unit in a different sequence causes no change in a simulation result. This is because the gates belonging to the gate group of a single unit do not constitute a sequence circuit. Accordingly, the fan-out buffer 7 by no means needs to preserve their input/output sequence in buffering new event data. Instead, it is preferable for the fan-out buffer 7 to reduce a duration for buffering new event data by changing their input/output sequence, thereby enhancing a processing efficiency.

However, because the fan-out buffer 7 uses a general-purpose buffer circuit such as a FIFO buffer, the fan-out buffer 7 outputs to the fan-out pipeline 1 new event data inputted from the evaluation pipeline 2 in their input sequence. Hence, the conventional generic logical simulation apparatus must provide for the fan-out buffer 7 two [2] counters for writing and reading new event data. Besides, the conventional generic logical simulation apparatus may not read out from the fan-out buffer 7 new event data to be outputted to the fan-out pipeline 1, while writing into the fan-out pipeline 1 new event data being inputted from the evaluation pipeline 2.

That is, the conventional generic logical simulation apparatus has a problem of putting on hold a readout (output) of new event data from the fan-out buffer 7 to the fan-out pipeline 1, during a write-in (input) of new event data from the evaluation pipeline 2 to the fan-out buffer 7.

SUMMARY OF THE INVENTION

This invention aims at providing a buffering circuit capable of reducing a duration necessary for outputting input data to an external circuit when their input/output sequence need not be preserved.

A buffer circuit of this invention comprises a storage unit for temporarily storing input data and a control unit for controlling an output of input data passing either through or over the storage unit.

Another buffer circuit of this invention further comprises a selection unit for selecting for an output either input data passing over (i.e. bypassing) the storage unit or input data passing through (i.e. once written into and then read out from) the storage unit. The control unit determines whether valid input data exist or clear and whether the external circuit is ready or unready for receiving input data, and controls, based on a determined result, the output of input data to an external circuit by selecting input data passing either over or through the storage unit.

Because this enables input data to be outputted "as is" to the external circuit ready for receiving data, this also reduces a time necessary for outputting input data via a buffer circuit.

A feature of the present invention resides in a buffer circuit comprising a storage unit for temporarily storing input data and a control unit for controlling an output of the input data either straight or via the storage unit.

DESCRIPTION OF THE DRAWINGS

One skilled in the art can easily understand additional features and objects of this invention from the attached drawings and the description of a preferred embodiment. In the drawings.

DETAILED DESCRIPTION OF THE PREFERRED EMBODIMENTS

Described below is a description of the preferred embodiments with reference to some of the attached drawings.

Figure 2:
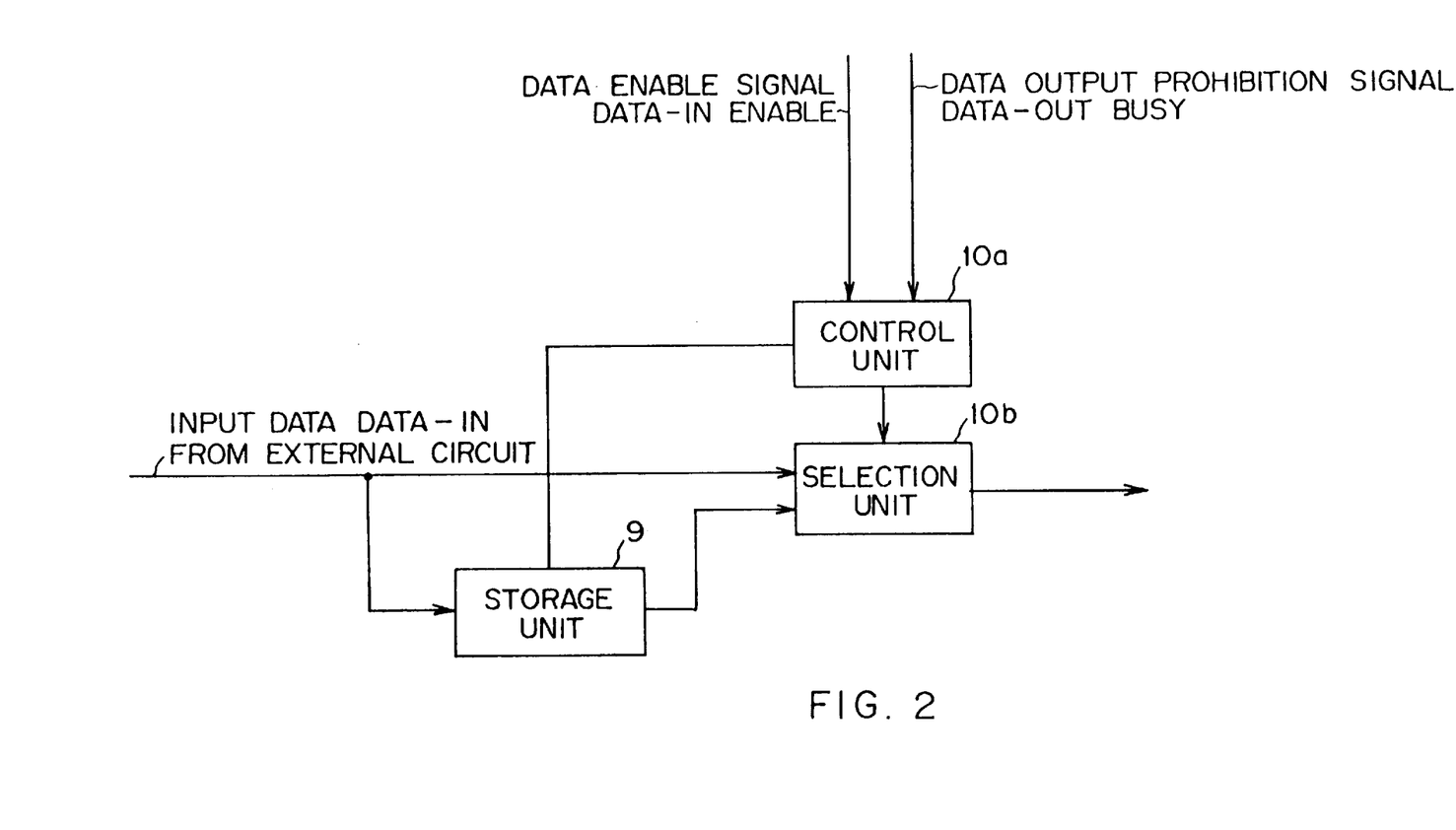
FIG. 2 is a block diagram outlining a principle of this invention.

FIG. 2 is a block diagram outlining a principle of this invention.

A storage unit 9 stores input data DATA-IN and may comprise a RAM (random access memory). A control unit 10a controls an output of input data DATA-IN to an external circuit either straight (i.e., directly) or via (by once writing them into and then reading them out from) the storage unit 9. A selection unit 10b selects for an output either input data DATA-IN passing over (i.e. bypassing) the storage unit 9 or input data DATA-IN passing through (i.e. once written into and then read out from) the storage unit 9.

The control unit 10a determines whether input data DATA-IN exist or are clear and whether the external circuit is ready or not for receiving input data, and controls, based on a determined result, an output of input data to an external circuit by selecting input data passing either over or through the storage unit 9.

The control unit 10a receives a data output prohibition signal +DATA-OUT BUSY, which is valid when an external circuit is ready for receiving output data and invalid when an external circuit is unready for receiving output data, and a data enable signal +DATA-IN ENABLE, which is valid when input data DATA-IN exist and invalid when input data DATA-IN are clear.

When the data enable signal +DATA-IN ENABLE is valid and the data output prohibition signal +DATA-OUT BUSY is invalid, the control unit 10a determines that input data DATA-IN exist and that the external circuit is ready for receiving input data DATA-IN, and has the selection unit 10b output input data DATA-IN straight to the external circuit.

When the data enable signal +DATA-IN ENABLE is valid and the data output prohibition signal +DATA-OUT BUSY is valid, the control unit 10a determines that input data DATA-IN exist and that the external circuit is unready for receiving input data DATA-IN, and writes input data DATA-IN into the storage unit 9.

When the data enable signal +DATA-IN ENABLE is invalid and the data output prohibition signal +DATA-OUT BUSY is invalid, the control unit 10a determines that input data DATA-IN are clear and that the external circuit is ready for receiving input data DATA-IN, reads out input data DATA-IN from the storage unit 9, and has the selection unit 10b output to the external circuit input data DATA-IN stored in the storage unit 9.

When the data enable signal +DATA-IN ENABLE is invalid and the data output prohibition signal +DATA-OUT BUSY is valid, the control unit 10a determines input data DATA-IN clear and the external circuit is unready for receiving input data DATA-IN, performs nothing, and stands by until the next timing.

Figure 3:
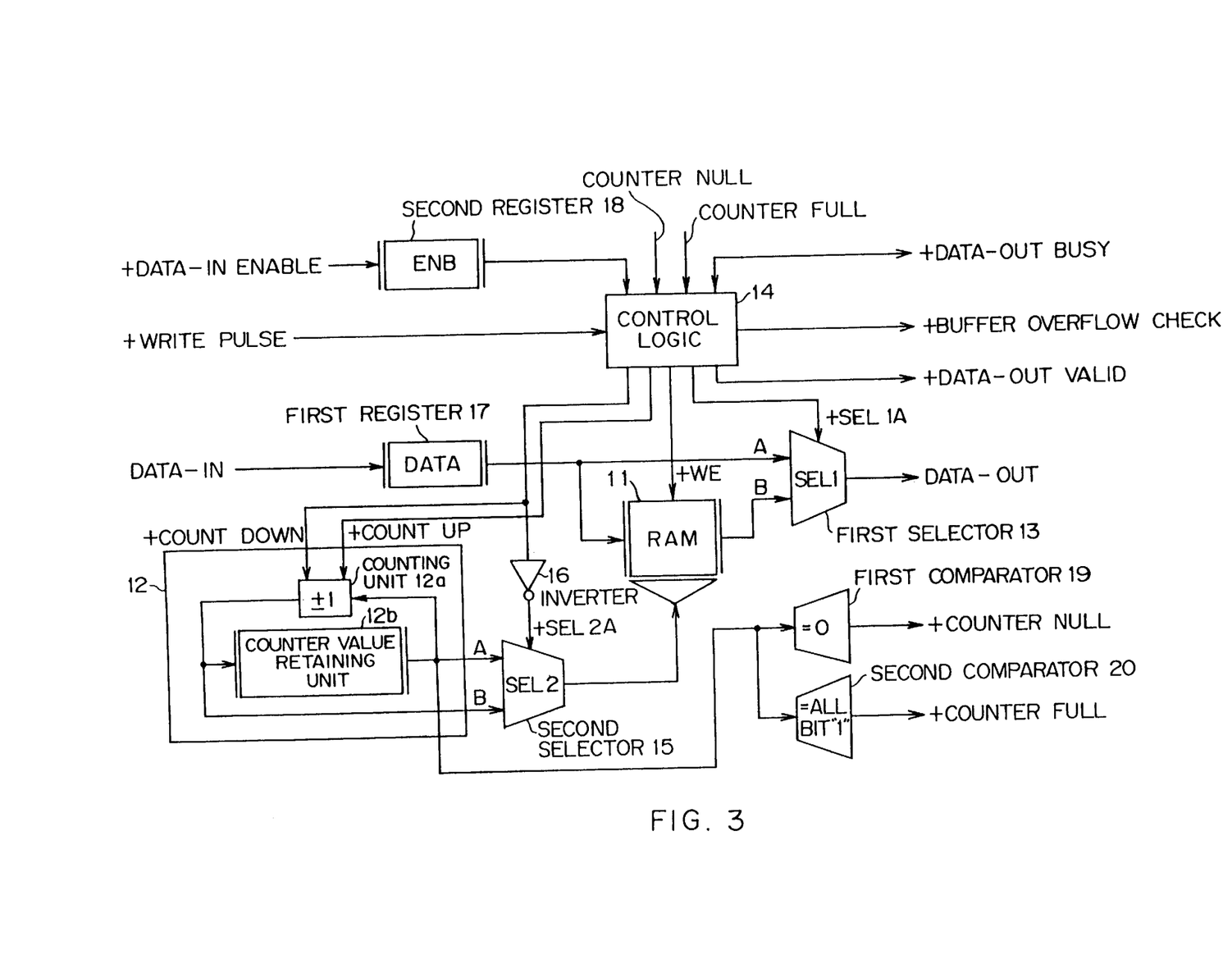
FIG. 3 is a block diagram showing the configuration of a buffer circuit pursuant to a first embodiment of this invention.

FIG. 3 is a block diagram showing the configuration of a buffer circuit pursuant to a first embodiment of this invention.

The buffer circuit comprises a RAM 11 for storing input data DATA-IN, a counter 12 for specifying a write-in address and a readout address of the RAM 11, a first selector (SEL1) 13 for selecting for an output to the external circuit as output data DATA-OUT either input data DATA-IN straight or input data DATA-IN outputted from the RAM 11, a control logic 14 for controlling a data readout from and a data write-in to the RAM 11 and a selection by the first selector 13, a second selector (SEL2) 15 for selecting for an output to the RAM 11 either a write-in address or a readout address both outputted from the counter 12, an inverter 16 for inverting a count down signal +COUNT DOWN generated by the control logic 14, a first register (DATA) 17 for latching input data and a second register (ENB) 18 for latching a data enable signal +DATA-IN ENABLE, a first comparator 19 for outputting a counter null signal +COUNTER NULL when the counter 12 has a counter value zero [0] in all bits, and a second comparator 20 for outputting a counter full signal +COUNTER FULL when the counter 12 has a counter value one [1] in all bits.

The RAM 11 is a last-in first-out RAM and receives in parallel n (where n is a finite integer), bits of input data DATA-IN, e.g. inputted from an evaluation pipeline of a logical simulation apparatus, via the first register (DATA) 17, and temporarily stores input data DATA-IN in accordance with the input of a write signal +WE generated by the control logic 14.

A positive sign [+] at the head end of a signal notation, as in the write signal +WE, indicates that the signal is valid when it is at a high level (i.e. one [1]).

The counter 12 comprises a counting unit 12a (composed of an adder/subtracter circuit) for counting up or down its counter value and a counter value retaining unit 12b for retaining its counter value. It is a binary n (where n is a finite integer), bit counter for generating for the RAM 11 a write-in address and a readout address of input data DATA-IN.

More specifically, the counting unit 12a counts up the counter value retained in the counter value retaining unit 12b, upon each receipt of a count up signal +COUNT UP generated by the control logic 14 in generating a write-in address, and counts down the counter value retained in the counter value retaining unit 12b, upon each receipt of a count down signal +COUNT DOWN generated by the control logic 14 while generating a readout address.

On generating a write-in address, after having the counter value retaining unit 12b supply a current counter value via an input terminal A of the second selector 15 to the RAM 11, the counter 12 has the counting unit 12a count up its counter value.

On generating a readout address, after having the counter value retaining unit 12b supply a current counter value via an input terminal B of the second selector 15 to the RAM 11, the counter 12 has the counting unit 12a count down its counter value.

In other words, the buffer circuit has the counter 12 count up its counter value, on writing input data DATA-IN into the RAM 11; and count up its counter value, on reading input data DATA-IN from the RAM 11.

To realize the above operation, the second selector (SEL2) 15 uses as its switching signal a second selection signal +SEL2 A obtained by the inverter 16 as an inversion of the count down signal +COUNT DOWN. When the second selection signal +SEL2 A is valid, i.e. when the count down signal +COUNT DOWN is invalid, the second selector (SEL2) 15 selects input terminal A. Conversely, when the second selection signal +SEL2 A is invalid, i.e. when the count down signal +COUNT DOWN is valid, the second selector (SEL2) 15 selects input terminal B.

Here, the counter 12 has the counter value retaining unit 12b have zero [0] as its initial value, such that the write-in of input data DATA-IN into the RAM 11 begins at address zero.

The first selector (SEL1) 13 is a circuit for selecting for an output to the external circuit input data DATA-IN passing either over or through the RAM 11.

When the first selection signal +SEL1 A supplied from the control logic 14 is valid (at a high level), the first selector 13 selects input terminal A, thereby outputting to the external circuit input data DATA-IN straight as output data DATA-OUT.

When the first selection signal +SEL1 A supplied from the control logic 14 is invalid (at a low level), the first selector (SEL1) 13 selects input terminal B, thereby outputting to the external circuit input data DATA-IN read out from the RAM 11 as output data DATA-OUT.

The control logic 14 receives via the second register (ENB) 18 one [1] bit of the data enable signal +DATA-IN ENABLE (a signal indicating by its validity or invalidity whether input data DATA-IN exist or are clear) together with input data DATA-IN e.g. from the evaluation pipeline of a logical simulation apparatus. It also receives one [1] bit of a data output prohibition signal +DATA-OUT BUSY (a signal indicating by its validity or invalidity whether the external circuit is unready or ready for receiving output data DATA-OUT) e.g. from the fan-out pipeline of a logical simulation apparatus.

Then, based on the validity or invalidity of the data enable signal +DATA-IN ENABLE and the data output prohibition signal +DATA-OUT BUSY, the control logic 14 determines whether input data DATA-IN exist or are clear and whether or not the external circuit is unready or ready for receiving output data DATA-OUT. Based on a determined result, it outputs input data DATA-IN straight to the external circuit, writes input data DATA-IN into the RAM 11, or outputs to the external circuit input data DATA-IN once written into the RAM 11 and then read out therefrom.

When the data enable signal +DATA-IN ENABLE is valid and the data output prohibition signal +DATA-OUT BUSY is invalid, the control unit 14 determines that input data DATA-IN exist and that the external circuit is ready for receiving the input data DATA-IN, validates the first selection signal +SEL1 A, thereby having the first selector (SEL1) 13 select input terminal A, and outputs input data DATA-IN straight to the external circuit. At the same time, the control logic 14 invalidates the count up signal +COUNT UP, and validates the write signal +WE, thereby writing into the RAM 11 input data DATA-IN, while prohibiting the counting unit 12a of the counter 12 from counting up its counter value. This enables the control logic 14 to write input data DATA-IN at the same address of the RAM 11 as that of the previous time.

When the data enable signal +DATA-IN ENABLE is valid and the data output prohibition signal +DATA-OUT BUSY is valid, the control unit 14 determines that input data DATA-IN exist and that the external circuit is unready for receiving the input data DATA-IN, validates the write signal +WE, and writes into the RAM 11 input data DATA-IN. Then, the control logic 14 validates the count up signal +COUNT UP, and has the counting unit 12a count up the counter value retained in the counter value retaining unit 12b. This enables the control logic 14 to update a write-in address.

When the data enable signal +DATA-IN ENABLE is invalid and the data output prohibition signal +DATA-OUT BUSY is invalid, the control unit 14 determines that input data DATA-IN clear and that the external circuit is ready for receiving the input data DATA-IN, validates the count down signal +COUNT DOWN, invalidates the write signal +WE and invalidates the first selection signal +SEL1 A. At this time, because the count down signal +COUNT DOWN is valid, the second selector (SEL2) 15 selects input terminal B for an output of input data DATA-IN to the RAM 11.

As a result, the counter 12 has the counting unit 12a count down the counter value, and the write-in address at 1 address before the present address is provided for the RAM 11 as a readout address through the second selector 15. The previously written input data DATA-IN are read from the RAM 11. Simultaneously, the control logic 14 nullifies the first select signal +SEL1 A to have the first selector 13 select the input terminal B and output externally the input data DATA IN read from the RAM 11 as output data DATA OUT.

When the data enable signal +DATA-IN ENABLE is invalid and the data output prohibition signal +DATA-OUT BUSY is valid, the control logic 14 determines input data DATA-IN are clear and the external circuit is unready for receiving the input data DATA-IN, performs nothing, and stands by until the next timing.

The control logic 14 receives a write pulse signal +WRITE PULSE for writing each bit of n bits of input data DATA-IN into the RAM 11, a counter null signal +COUNTER NULL outputted from the first comparator 19 when the counter 12 has the counter value retaining unit 12b retain a counter value whose bits are all zero [0], and a counter full signal +COUNTER FULL outputted from the second comparator 20 when the counter 12 has the counter value retaining unit 12b retain a counter value whose bits are all one [1].

The control logic 14 supplies an output data validation signal +DATA-OUT VALID indicating a valid transmission of output data DATA-OUT to the external circuit, and an overflow signal +BUFFER OVERFLOW CHECK indicating an overflow from the buffer circuit.

Figure 4:
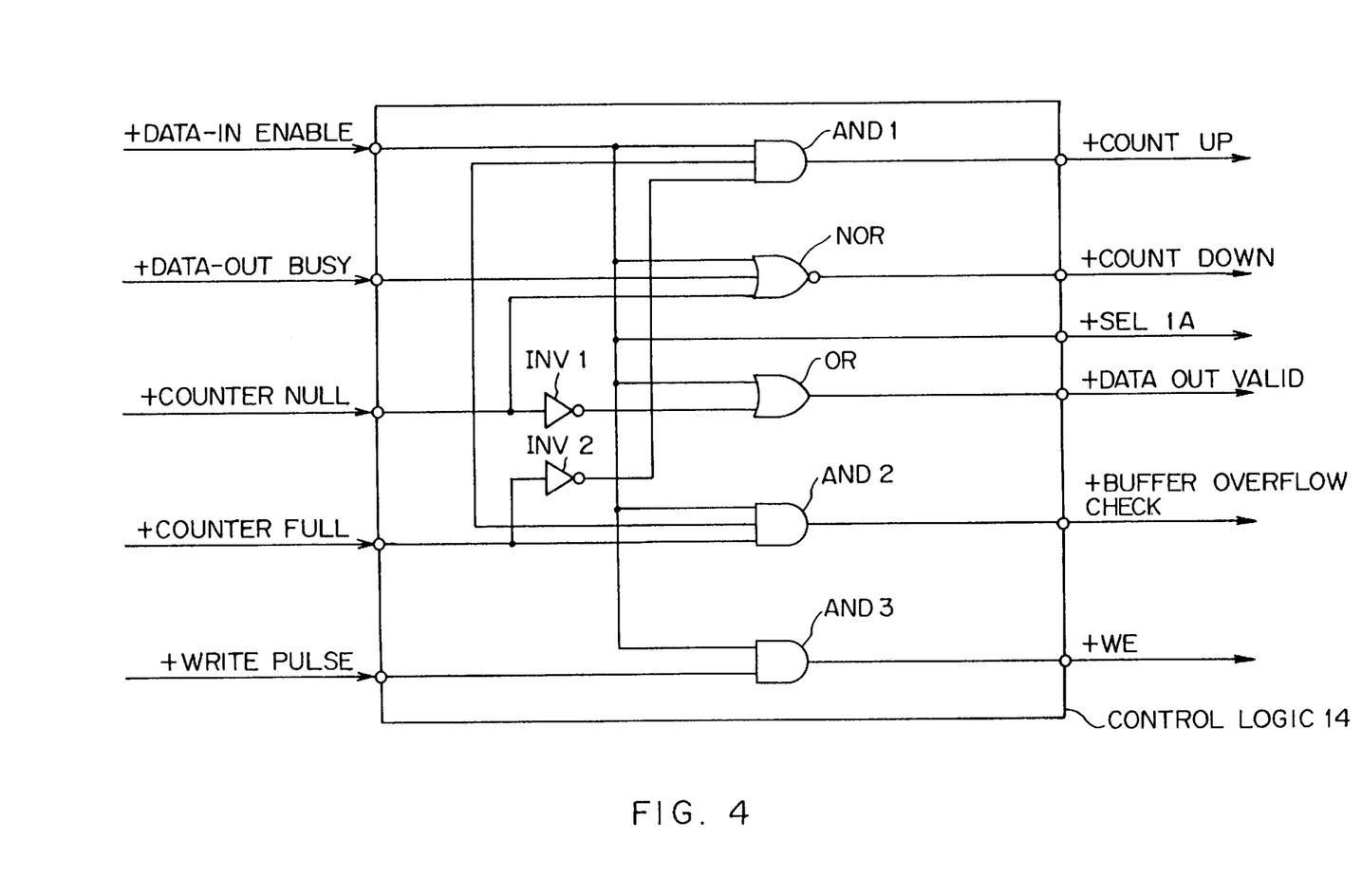
FIG. 4 is a circuit diagram detailing a control logic.

FIG. 4 is a circuit diagram detailing a control logic 14.

More specifically, FIG. 4 shows a concrete configuration of the control logic 14.

The control logic 14 comprises a first AND gate AND1, a second AND gate AND2, a third AND gate AND3, an OR gate OR, a NOR gate NOR, a first inverter INV1, and a second inverter INV2. As explained earlier in the description of FIG. 3, the control logic 14 receives as its inputs the data enable signal +DATA-IN ENABLE, the data output prohibition signal +DATA-OUT BUSY, the counter null signal +COUNTER NULL, the counter full signal +COUNTER FULL, and the write pulse signal +WRITE PULSE. As well, the control logic 14 supplies as its outputs the count up signal +COUNT UP, the count down signal +COUNT DOWN, the first selection signal +SEL1 A, the output data validation signal +DATA-OUT VALID, the overflow signal +BUFFER OVERFLOW CHECK, and the write signal +WE.

Described below with emphasis is an output signal from the control logic 14.

The count up signal +COUNT UP, which is an output signal from the first AND gate AND1, is valid (at a high level), when the data enable signal +DATA-IN ENABLE, the data output prohibition signal +DATA-OUT BUSY and an inversion of the counter full signal +COUNTER FULL by the second inverter INV2, which are the input signals of the first AND gate AND1, are all valid.

Further, the count down signal +COUNT DOWN, which is an output signal from the NOR gate NOR, is valid, when the data enable signal +DATA-IN ENABLE, the data output prohibition signal +DATA-OUT BUSY and the counter null signal +COUNTER NULL, which are the input signals to the NOR gate NOR, are all invalid (at a low level).

The first selection signal +SEL1 A is valid, only when a data enable signal +DATA-IN ENABLE is valid.

The output data validation signal +DATA-OUT VALID, which is the output signal from the OR gate OR, is valid, when at least either of the data enable signal +DATA-IN ENABLE or an inversion of the counter null signal +COUNTER NULL by the first inverter INV1, which are the input signals to the OR gate, is valid.

The output data validation signal +DATA-OUT VALID is valid, when input data DATA-IN exist or when the RAM 11 stores input data DATA-IN.

The overflow signal +BUFFER OVERFLOW CHECK, which is the output signal from the second AND gate AND2, is valid, when the data enable signal +DATA-IN ENABLE, the data output prohibition signal +DATA-OUT BUSY and the counter full signal +COUNTER FULL, which are the input signals to the second AND gate AND2, are all valid.

The overflow signal +BUFFER OVERFLOW CHECK indicates an overflow of the counter value from the counter 12, when the control logic 14 has the RAM 11 store input data DATA-IN beyond its capacity.

The write signal +WE, which is the output signal from the third AND gate AND3, is valid, when the data enable signal +DATA-IN ENABLE and a write pulse signal +WRITE PULSE, which are the input signals to the third AND gate AND3, are all valid.

Described below further is the operation of the buffer circuit having the above configuration.

Here, to facilitate a comprehension of the operation of the buffer circuit, the following three [3] cases are considered, which will be explained in sequence.

(1) A first case in which the external circuit is ready for receiving output data DATA-OUT, when input data DATA-IN exist.

(2) A second case in which the external circuit is unready for receiving output data DATA-OUT, when input data DATA-IN exist.

(3) A third case in which the external circuit becomes ready for receiving output data DATA-OUT at any timing when input data DATA-IN exist, and when input data DATA-IN are clear at any later timing.

(1) The first case is described as follows:

A data enable signal +DATA-IN ENABLE, a write pulse signal +WRITE PULSE and a data output prohibition signal +DATA OUT BUSY, which are the input signals to the control logic 14, are valid, valid and invalid, respectively, when input data DATA-IN exist and when the external circuit is ready for receiving output data DATA-OUT.

The counter null signal +COUNTER NULL outputted from the first comparator 19 and the counter full signal +COUNTER FULL outputted from the second comparator 20, when input data DATA-IN clear from the RAM11 and when the counter 12 has the counter value retaining unit 12b still retain its initial value zero [0] as a current counter value.

The above operation can be summarized with reference to FIG. 3 as follows:

At this time, three [3] of the six [6] output signals from the control logic 14, namely, the first selection signal +SEL1 A, the output data signal +DATA-OUT VALID and the write signal +WE are valid, whereas three [3] others, namely, the count up signal +COUNT UP, the count down signal +COUNT DOWN and the overflow signal +BUFFER OVERFLOW CHECK, are invalid.

As well, because the inverter 16 inverts the count down signal +COUNT DOWN, which is invalid at this time, the second selection signal +SEL2 A inputted into the second selector (SEL2) 15 is valid, thereby causing the second selector (SEL2) 15 to select input terminal A.

That is, the control logic 14 supplies to the RAM 11 a write signal +WE, which is valid. It supplies to the counting unit 12a of the counter 12 the count up signal +COUNT UP and the count down signal +COUNT DOWN, which are both invalid. It supplies to the first selector (SEL1) 13 the first selection signal +SEL1 A, which is valid. It supplies to the second selector (SEL2) 15 the second selection signal +SEL2 A, which is valid, (obtained by the inverter 16 as an inversion of the count down signal +COUNT DOWN, which is invalid).

Accordingly, the control logic 14 has the first selector (SEL1) 13 output straight as output data DATA-OUT to the external circuit input data DATA-IN inputted from input terminal A.

Also, because both the count up signal +COUNT UP and the count down signal +COUNT DOWN are invalid, the counter 12 prohibits counting unit 12a from counting up or down, thus having the counter value retaining unit 12b retain initial value zero [0] as its counter value. Because the second selector (SEL2) 15 selects input terminal A, it outputs repeatedly to the RAM 11 the initial value zero [0] as a write-in address. Consequently, the RAM 11 allows input data DATA-IN to be overwritten at the same address (at the address zero in this case) repeatedly.

(2) The second case is described as follows:

A data enable signal +DATA-IN ENABLE, a write pulse signal +WRITE PULSE and a data output prohibition signal +DATA OUT BUSY, which are the input signals to the control logic 14, are all valid, when input data DATA-IN exist and when the external circuit is unready for receiving output data DATA-OUT.

The counter null signal +COUNTER NULL outputted from the first comparator 19 and the counter full signal +COUNTER FULL outputted from the second comparator 20, when input data DATA-IN clear from the RAM11 and when the counter 12 has the counter value retaining unit 12b still retain its initial value zero [0] as a current counter value.

The above operation can be summarized with reference to FIG. 3 as follows:

At this time, four [4] of the six [6] output signals from the control logic 14, namely, the count up signal +COUNT UP, the first selection signal +SEL1 A, the output data signal +DATA-OUT VALID and the write signal +WE are-valid, whereas two [2] others, namely, the count down signal +COUNT DOWN and the overflow signal +BUFFER OVERFLOW CHECK, are invalid.

As well, because the inverter 16 inverts the count down signal +COUNT DOWN, which is invalid at this time, the second selection signal +SEL2 A inputted into the second selector (SEL2) 15 is valid, thereby causing the second selector (SEL2) 15 to select input terminal A for outputting to the RAM 11 a current counter value retained in the counter value retaining unit 12b.

That is, the control logic 14 supplies to the RAM 11 a write signal +WE, which is valid. It supplies to the counting unit 12a of the counter 12 the count up signal +COUNT UP and the count down signal +COUNT DOWN, which are valid and invalid, respectively. It supplies to the first selector (SEL1) 13 the first selection signal +SEL1 A, which is valid. It supplies to the second selector (SEL2) 15 the second selection signal +SEL2 A, which is valid, (obtained by the inverter 16 as an inversion of the count down signal +COUNT DOWN, which is invalid).

Accordingly, after supplying the initial value zero [0], which is a current counter value of the counter value retaining unit 12b of the counter 12 via terminal A of the second selector (SEL2) 15 to the RAM 11, the control logic 14 has the counting unit 12a of the counter 12 count up the counter value retained in the counter value retaining unit 12b. Thereafter, after supplying input data DATA-IN to the RAM 11, the control logic 14 has the counting unit 12a of the counter 12 count up the counter value and keeps supplying the write signal +WE to the RAM 11. Consequently, the RAM 11 allows input data DATA-IN inputted via the first register (DATA) 17 to be written sequentially at and after the address zero.

Also, because the first selection signal +SEL1 A is valid, the control logic 14 has the first selector (SEL1) 13 select input terminal A and output straight to the external circuit input data DATA-IN inputted from input terminal A. However, because the external circuit is unready for receiving output data DATA-OUT, it does not receive them.

As in this second case, when input data DATA-IN exist and when the external circuit is unready for receiving output data DATA-OUT, the data input/output sequence is completely reversed, since a readout is performed in a direction opposite to a write-in, on receiving an instruction for a readout of input data DATA-IN from the RAM 11.

(3) The third case is described as follows:

A data enable signal +DATA-IN ENABLE, a write pulse signal +WRITE PULSE and a data output prohibition signal +DATA OUT BUSY, which are the input signals to the control logic 14, are all valid, (as with the second case), when the external circuit becomes ready for receiving output data DATA-OUT at any timing during the buffer circuit is receiving input data DATA-IN and when the buffer circuit stops receiving input data DATA-IN at any later timing. At a timing when the external circuit becomes ready for receiving output data DATA-OUT while the buffer circuit is receiving input data DATA-IN, the data output prohibition signal +DATA-OUT BUSY becomes invalid. When the buffer circuit stops receiving input data DATA-IN at any later timing, the data enable signal +DATA-IN ENABLE and the write pulse signal +WRITE PULSE become invalid.

Assume now that the counter null signal +COUNTER NULL outputted from the first comparator 19 and the counter full signal +COUNTER FULL outputted from the second comparator 20, are both invalid, when the counter 12 has the counter value retaining unit 12b retain a current counter value greater than its initial value zero [0] and when the counter full signal +COUNTER FULL is invalid.

At this time, three [3] of the six [6] output signals from the control logic 14, namely, the first selection signal +SEL1 A, the output data signal +DATA-OUT VALID and the write signal +WE are valid, whereas three [3] others, namely, the count up signal +COUNT UP, the count down signal +COUNT DOWN and the overflow signal +BUFFER OVERFLOW CHECK, are invalid.

As well, when the buffer circuit stops receiving input data DATA-IN at any later timing, only two [2] of the six [6] input signals to the control logic 14, namely, the count down signal +COUNT DOWN and the data output signal +DATA-OUT VALID become valid, whereas four [4] others, namely the count up signal +COUNT UP, the first selection signal +SEL1 A, the overflow signal +BUFFER OVERFLOW CHECK and the write signal +WE become invalid.

As explained earlier in the description of FIG. 3, because the inverter 16 inverts the count down signal +COUNT DOWN, which is invalid at this time, the second selection signal +SEL2 A inputted into the second selector (SEL2) 15 is valid, thereby causing the second selector (SEL2) 15 to select input terminal A for outputting to the RAM 11 a current counter value retained in the counter value retaining unit 12b. When the count down signal +COUNT DOWN is valid, i.e. when the second selection signal +SEL1 A is invalid, the second selector (SEL2) 15 selects input terminal B for outputting to the RAM 11 a current counter value counted down by the counting unit 12a.

The above operation can be summarized with reference to FIG. 3 as follows:

When the external circuit becomes ready for receiving output data DATA-OUT, the control logic 14 supplies to the RAM 11 a write signal +WE, which is valid. It supplies to the counting unit 12a of the counter 12 the count up signal +COUNT UP and the count down signal +COUNT DOWN, which are both invalid. It supplies to the first selector (SEL1) 13 the first selection signal +SEL1 A, which is valid. It supplies to the second selector (SEL2) 15 the second selection signal +SEL2 A, which is valid, (obtained by the inverter 16 as an inversion of the count down signal +COUNT DOWN, which is invalid).

Accordingly, the control logic 14 has the first selector (SEL1) 13 output straight to the external circuit as output data DATA-OUT input data DATA-IN latched in the first register (DATA) 17 and inputted from input terminal A, when the external circuit becomes ready for receiving them. Simultaneously, the control logic 14 prohibits the counting unit 12a of the counter 12 from counting up a current counter value, which has heretofore counted it up for generating a write-in address of input data DATA-IN, thereby having the counter value retaining unit 12b retain a current counter value.

Then, the control logic 14 has the second selector (SEL2) 15 output to the RAM 11 the current counter value inputted via terminal A as a write-in address. Consequently, the RAM 11 allows input data DATA-IN (supplied via the first register 17) to be overwritten at a predetermined write-in address specified by the current counter value retained in the counter value retaining unit 12b of the counter 12.

When the buffer circuit stops receiving input data DATA-IN at any later timing, the control logic 14 supplies to the RAM 11, the write signal +WE, which is invalid. It supplies to the counting unit 12a of the counter 12 the count up signal +COUNT UP and the count down signal +COUNT DOWN, which are invalid and valid, respectively. It supplies to the first selector (SEL1) 13 the first selection signal +SEL1 A, which is invalid. It supplies to the second selector (SEL2) 15 the second selection signal +SEL2 A, which is invalid, (obtained by the inverter 16 as an inversion of the count down signal +COUNT DOWN, which is valid).

When the buffer circuit stops receiving input data DATA-IN, the control logic 14 has the counting unit 12a of the counter 12 count down a current counter value, which has heretofore counted it up for generating a write-in address of input data DATA-IN, thereby having the counter value retaining unit 12b retain a current counter value, supplies the current counter value to the RAM 11 via input terminal B of the second selector (SEL2) 15, and reads out from the RAM 11 the input data DATA-IN at the readout address specified by the counter value.

Accordingly, the control logic 14 has the first selector (SEL1) 13 output as output data DATA-OUT to the external circuit input data DATA-IN once written into and then read out from the RAM 11 and inputted from input terminal B, sequentially towards the address zero, starting from the address one [1] before the predetermined address.

As in this third case (3), when the external circuit becomes unready for receiving output data DATA-OUT at any timing while the buffer circuit receives input data DATA-IN and when the buffer circuit stops receiving input data DATA-IN at any later timing, the control logic 14 writes input data DATA-IN into the RAM 11. Then, when the external circuit becomes ready for receiving output data DATA-OUT, the control logic 14 has the first selector (SEL1) 13 select input terminal A for a straight output of the subsequent input data DATA-IN latched in the first register (DATA) 17. When the first register (DATA) 17 latches no more input data DATA-IN, the control logic 14 has the first selector (SEL1) 13 select input terminal B for outputting as output data DATA-OUT input data DATA-IN once written into and then read out from the RAM 11.

As explained above in the description of the first embodiment, when the external circuit becomes ready for receiving output data DATA-OUT, the buffer circuit outputs input data DATA-IN straight. Hence, a prior art problem of having an external circuit wait for output data DATA-OUT by prioritizing a write-in of input data DATA-IN into a memory (e.g. the RAM 11) is eliminated, and a duration required for outputting input data DATA-IN via the buffer circuit to the external circuit is reduced dramatically.

The above detailed description of a buffer circuit pertains only to one [1] form of the first embodiment of this invention. It is possible to modify the configuration of the counter 12 as a variation of the first embodiment.

In the first embodiment, the counter 12 has the counting unit 12a sequentially count up its counter value, after supplying via terminal A of the second selector (SEL2) 15 to the RAM 11 a current value retained in the counter value retaining unit 12b, in generating a write-in address; and the counter 12 supplies its counter value via input terminal B of the second selector (SEL2) 15 to the RAM 11, after having the counting unit 12a sequentially count down its counter value retained in the counter value retaining unit 12b and having already been counted up by the counting unit 12a, in generating a readout address.

However, this can be made quite the opposite. That is, the counter 12 sequentially supplies to the RAM 11 via input terminal B of the second selector (SEL2) 15 its counter value by having the counting unit 12a count up a current counter value retained in the counter value retaining unit 12b, in generating a write-in address; and the counter 12 has the counting unit 12a count down its counter value, after supplying to the RAM 11 a current counter value retained in the counter value retaining unit 12b having already been counted up in correspondence with the generation of a write-in address, in generating a readout address.

In other words, in writing input data DATA-IN, the counter 12 has the counting unit 12a count up its count value before writing a block of input data DATA-IN into the RAM 11; and in reading input data DATA-IN, the counter 12 reads a block of input data DATA-IN from the RAM 11 before having the counting unit 12a count down the current value.

In this case, the inverter 16 becomes unnecessary for controlling the second selector (SEL2) 15, which reduces the number of parts. It becomes only necessary for the control logic 14 to supply "as is" to the second selector (SEL2) 15 the count down signal +COUNT DOWN as the second selection signal +SEL2 A. As well, although the counter 12 may set zero [0] as an initial value to the counter value retaining unit 12b, as with the original form of the first embodiment, a write-in of input data DATA-IN to the RAM 11 necessarily begins at the first address, because of its configuration. A global operation of the buffer circuit adopting the counter 12 in this variation is the same as that of the original form of the first embodiment.

Figure 5:
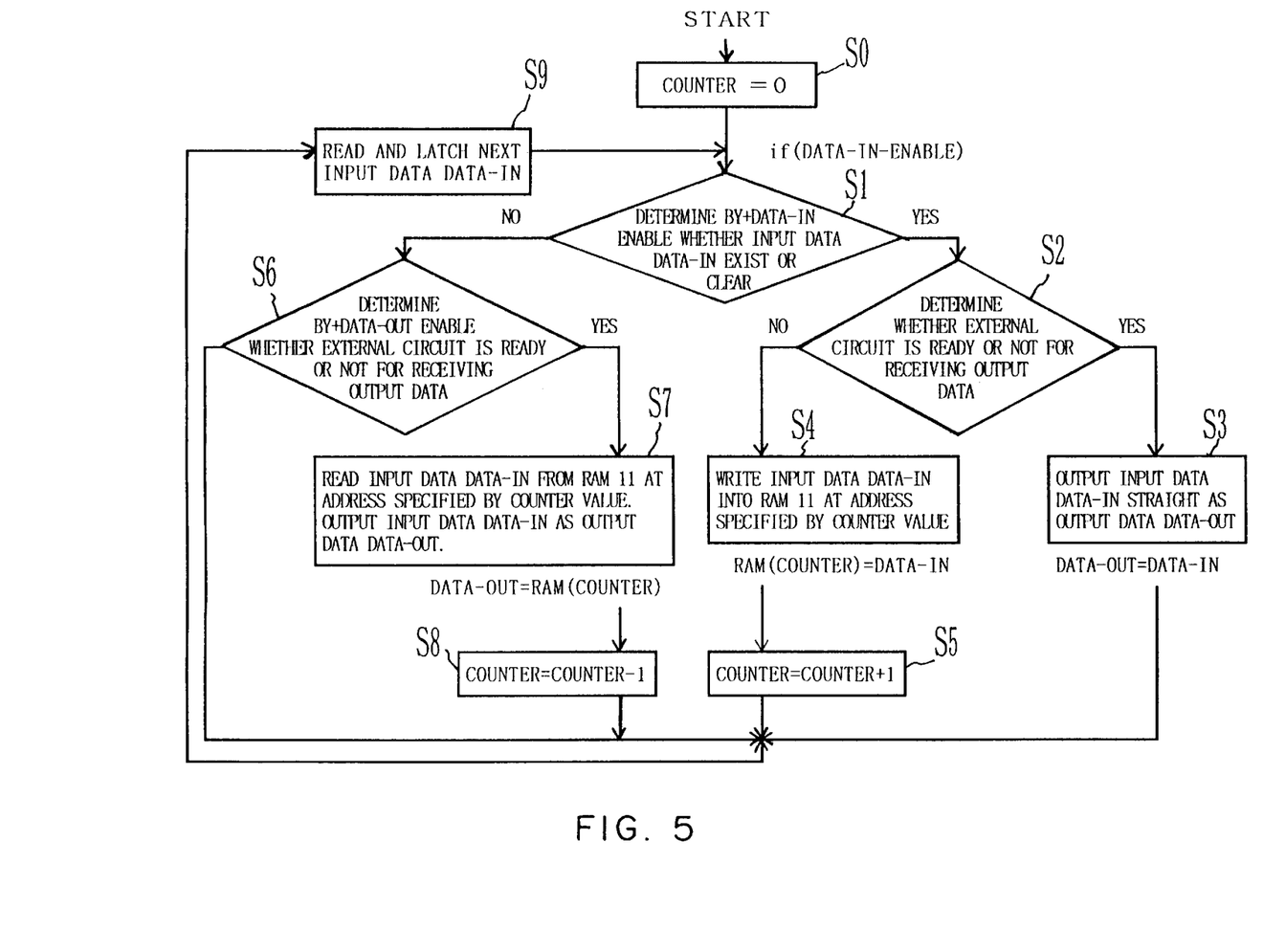
FIG. 5 is a flowchart showing the operation of a second embodiment of this invention.

FIG. 5 is a flowchart showing the operation of a second embodiment of this invention.

More specifically, FIG. 5 illustrates steps of a software control for realizing the control logic 14.

Parts used in the second embodiment which are the same as those used in the first embodiment have the same numbers.

After starting the process (START), the control logic 14 initiates step S0. Step S0: The control logic 14 has the counter 12 initialize its counter value to zero [0]. Then, the process continues on to step S1. Step S1: The control logic 14 determines from the validity of the data enable signal +DATA-IN ENABLE whether input data DATA IN exist or clear. A positive determination (YES) invokes step S2, and a negative determination (NO) invokes step S6. Step S2: The control logic 14 determines whether the external circuit is ready or unready for receiving output data DATA-OUT. A positive determination (YES) invokes step S3, and a negative determination (NO) invokes step S4. Step S3: The control logic 14 outputs input data DATA-IN straight as output data DATA-OUT. Then, the process continues on to step S9. Step S4: The control logic 14 writes input data DATA-IN into the RAM 11 at a write-in address specified by the counter 12. Then, the process continues on to step S5. Step S5: The control logic 14 has the counter 12 increment its counter value by one [1]. Then, the process continues on to step S9.

That is, if input data DATA IN exist and an external circuit can receive data, then input data DATA IN are passed through to the external circuit. If the external circuit cannot receive data, then input data DATA IN are written to the RAM 11. Step S6: The control logic 14 determines from the validity of the data enable signal +DATA-IN ENABLE whether the external circuit is ready or unready for receiving output data DATA-OUT. A positive determination (YES) invokes step S7, and a negative determination (NO) invokes step S9. Step S7: The control logic 14 reads input data DATA-IN from the RAM 11 at a readout address specified by the counter 12. Then, the process continues on to step S8. Step S8: The control logic 14 has the counter 12 decrement its counter value by one [1]. Then, the process continues on to step S9. Step S9: The control logic 14 has the first register (DATA) 17 read and latch next input data DATA-IN. Then, the process continues on to step S1.

That is, when input data DATA-IN are clear and when the external circuit is ready for receiving output data DATA-OUT, the control logic reads input data DATA-IN from the RAM 11 and outputs to the external circuit input data DATA-IN as DATA-OUT.

As described above in detail, by determining whether input data DATA-IN exist or clear and whether an external circuit is ready or unready for receiving output data DATA-OUT, the buffer circuit determines whether to output input data DATA-IN straight to an external circuit, to write input data DATA-IN into a storage device, or to output input data DATA-IN once written into and then read out from a storage device.

Thus, when the external circuit is ready for receiving output data DATA-OUT, by outputting input data DATA-IN as output data DATA-OUT straight, the buffer circuit writes data into a storage device, thereby eliminating a wait for output data DATA-OUT by the external circuit. Consequently, this invention is effective in greatly reducing a duration necessary for outputting data via a buffer circuit to an external circuit, when a data input/output sequence need not be preserved.

What is claimed is:

1. A buffer circuit comprising:

storage means for receiving transmitted input data and for writing said transmitted input data to temporarily store said transmitted input data;

control means for determining whether an external circuit is ready or not ready to receive said transmitted input data, and for outputting a corresponding result of the determination;

selection means for receiving said transmitted input data and for selecting to directly output said transmitted input data or to output said transmitted input data written in said storage means, based on said result; and one counter for outputting to said storage means a counter value as a write-in or read-out address, by incrementing said counter value when said control means writes said input data into said storage means, and by decrementing said counter value when said control means reads said input data from said storage means.

2. The buffer circuit as set forth in claim 1, wherein said control means further:

controls said selection means to select said input data to be directly outputted to an external circuit based on determining that said input data are valid and that said external circuit is ready for receiving said input data;

writes said input data into said storage means based on determining that said input data are valid and that said external circuit is not ready for receiving said input data; and control said selection means to select said input data written into said storage means to be read out from said storage means and output to said external circuit based on determining that said input data are invalid and that said external circuit is ready for receiving said input data.

3. The buffer circuit as set forth in claim 1, wherein said buffer circuit is used in a logic simulation device which outputs in an order different from an input sequence.

4. A buffer circuit comprising:

storage means for receiving transmitted input data and for writing said transmitted input data to temporarily store said transmitted input data;

control means for determining whether an external circuit is ready or not ready to receive said transmitted input data, and for outputting a corresponding result of the determination;

selection means for receiving said transmitted input data and for selecting to directly output said transmitted input data or to output said transmitted input data written in said storage means, based on said result;

one counter for outputting to said storage means a counter value as a write-in or read-out address, by incrementing said counter value when said control means writes said input data into said storage means, and by decrementing said counter value when said control means reads said input data from said storage means; wherein said control means further:

controls said selection means to select said input data to be directly output to said external circuit based on determining that said external circuit is ready for receiving said input data;

writes said input data into said storage means at said write-in address that said counter specifies by said counter value based on determining that said external circuit is not ready for receiving said input data; and controls said selection means to select said input data to be written into and then read out from said storage means and output to said external circuit based on determining that said external circuit is ready for receiving said input data.

5. A buffer circuit comprising:

a memory for storing transmitted input data;

a first selector for selecting one of said transmitted input data to be directly outputted and said transmitted input data stored in said memory to be read out from said memory;

a control circuit for determining whether an external circuit is ready or not ready for receiving said input data, for outputting a corresponding result, and for controlling said first selector, based on said result, to select one of said transmitted input data to be directly output to said external circuit and said input data written into said memory to be read out from said memory and output to said external circuit; and one counter for outputting to said storage means a counter value as a write-in or read-out address, by incrementing said counter value when said control means writes said input data into said storage means, and by decrementing said counter value when said control means reads said input data from said storage means.

6. The buffer circuit as set forth in claim 5, wherein said control circuit further:

controls said first selector to select said transmitted input data to be directly outputted to said external circuit based on determining that said external circuit is ready for receiving said transmitted input data;

writes said input data into said memory based on determining that said external circuit is not ready for receiving said input data; and controls said first selector to select said input data written into said memory to be read out from said memory based on determining that said external circuit is ready for receiving said input data.

7. A buffer circuit comprising:

a memory for storing transmitted input data;

a first selector for selecting one of said transmitted input data to be directly outputted and said transmitted input data stored in said memory to be read out from said memory;

a control circuit for determining whether an external circuit is ready or not ready for receiving said input data, for outputting a corresponding result, and for controlling said first selector, based on said result, to select one of said transmitted input data to be directly output to said external circuit and said input data written into said memory to be read out from said memory and output to said external circuit;

one counter for outputting to said memory a counter value as a write-in or read-out address, by incrementing said counter value when said control circuit writes said input data into said memory, and by decrementing said counter value when said control circuit reads said input data out from said memory; and wherein said control circuit further:

writes said input data into said memory at said write-in address that said counter specifies by said counter value based on determining that said external circuit is not ready for receiving said input data; and control said first selector to select said input data to be written into and then read out from said memory and output to said external circuit based on determining that said external circuit is ready for receiving said input data.

8. The buffer circuit as set forth in claim 7, wherein said counter comprises:

an adder and subtracter circuit for incrementing and decrementing said counter value; and a counter value retaining circuit for retaining a current counter value having been incremented and decremented by said adder and subtracter circuit.

9. The buffer circuit as set forth in claim 8, further comprising:

a second selector for selecting an output to said memory one of a current counter value retained in said counter value retaining circuit of said counter and said counter value incremented and decremented by said adder and subtracter circuit.

10. The buffer circuit as set forth in claim 9, wherein said control circuit:

controls said second selector to select for an output to said memory a current counter value retained in said counter value retaining circuit of said counter as a write-in address based on determining that said input data are valid and that said external circuit is not ready for receiving said input data;

controls said second selector to select for an output to said memory a counter value incremented and decremented by said adder and subtracter circuit of said counter as a read-out address based on determining that said input data are invalid and that said external circuit is ready for receiving said input data;

reads out from said memory said input data written in said memory at said write-in address; and supplies said read out input data via said first selector to said external circuit.

11. The buffer circuit as set forth in claim 9, wherein said control circuit, based on determining that said input data are valid and said external circuit is ready for receiving said input data:

controls said second selector to select an output to said memory a current counter value retained in said counter value retaining circuit of said counter as a write-in address, thereby causing said input data to be overwritten at said write-in address; and controls said first selector to select said input data to be directly output to said external circuit.

12. The buffer circuit as set forth in claim 9, wherein said control circuit controls:

said second selector to select an output to said memory as a write-in address a counter value after being incremented by said adder and subtracter circuit and retained in said counter value retaining circuit of said counter based on determining that said input data are valid and that said external circuit is not ready for receiving said input data; and said second selector to select an output to said memory as a readout address a current counter value before being decremented by said adder and subtracter circuit of said counter based on determining that said input data are invalid and that said external circuit is not ready for receiving said input data.

13. A buffer circuit comprising:

storage means for receiving transmitted input data and for writing said transmitted input data to temporarily store said transmitted input data;

control means for determining whether an external circuit is ready or not ready to receive said transmitted input data, and for outputting a corresponding result of the determination;

selection means for receiving said transmitted input data and for selecting to directly output said transmitted input data or to output said transmitted input data written in said storage means, based on said result; and one counter outputting to said storage means a counter value as a write-in or read-out address, by incrementing said counter value when said control means writes said input data into said storage means, and by decrementing said counter value when said control means reads said input data from said storage means.

14. A buffer circuit comprising:

a memory storing transmitted input data;

a selector selecting one of said transmitted input data to be directly outputted and said transmitted input data stored in said memory to be read out from said memory;

a control circuit determining whether an external circuit is ready or not ready for receiving said input data, outputting a corresponding result, and controlling said first selector, based on said result, to select one of said transmitted input data to be directly output to said external circuit and said input data written into said memory to be read out from said memory and output to said external circuit; and one counter outputting to said memory a counter value as a write-in or read-out address, by incrementing said counter value when said control circuit writes said input data into said memory, and by decrementing said counter value when said control circuit reads said input data out from said memory.

* * * * *

UNITED STATES PATENT AND TRADEMARK OFFICE
CERTIFICATE OF CORRECTION

PATENT NO.: 5,937,430
DATED : August 10, 1999
INVENTOR(S): Minoru SAITOH, et al.

It is certified that error appears in the above-identified patent and that said Letters Patent is hereby corrected as shown below:

[73] Assignee

Please insert --Fujitsu Automation Limited-- the second assignee, which was omitted.

Signed and Sealed this

Twenty-second Day of August, 2000

Attest:

Q. TODD DICKINSON

*Attesting Officer*           *Director of Patents and Trademarks*